(12) United States Patent
Salter et al.

(10) Patent No.: US 10,391,943 B2
(45) Date of Patent: Aug. 27, 2019

(54) VEHICLE LAMP ASSEMBLY

(71) Applicant: Ford Global Technologies, LLC, Dearborn, MI (US)

(72) Inventors: Stuart C. Salter, White Lake, MI (US); Paul Kenneth Dellock, Northville, MI (US); Ulrich Stuhec, Ann Arbor, MI (US); Keith Hoelscher, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 15/728,013

(22) Filed: Oct. 9, 2017

(65) Prior Publication Data

US 2019/0106058 A1 Apr. 11, 2019

(51) Int. Cl.
| | |
|---|---|
| B60R 1/12 | (2006.01) |
| B60Q 1/00 | (2006.01) |
| B60R 1/074 | (2006.01) |
| B60Q 1/26 | (2006.01) |
| B60Q 1/32 | (2006.01) |
| B60R 1/062 | (2006.01) |

(52) U.S. Cl.
CPC ............ B60R 1/1207 (2013.01); B60Q 1/00 (2013.01); B60Q 1/0076 (2013.01); B60Q 1/2607 (2013.01); B60Q 1/2665 (2013.01); B60Q 1/32 (2013.01); B60R 1/062 (2013.01); B60R 1/074 (2013.01); B60R 1/12 (2013.01); B60Q 2400/40 (2013.01); B60Q 2900/30 (2013.01)

(58) Field of Classification Search
CPC .......... B60R 1/062; B60R 1/074; B60R 1/12; B60R 1/1207; B60Q 1/00; B60Q 1/0076; B60Q 1/2607; B60Q 1/2665; B60Q 1/32
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 5,871,275 | A | 2/1999 | O'Farrell et al. |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Thomas M Sember
(74) *Attorney, Agent, or Firm* — Vichit Chea; Price Heneveld LLP

(57) ABSTRACT

A vehicle mirror assembly is provided herein. The vehicle mirror assembly includes a housing operable between a deployed position and a folded position. A lamp assembly is coupled to the housing and has a first light source configured to direct light rearwardly of the housing and a second light source configured to direct light forwardly of the housing. The housing is configured to move from the deployed position to the folded position when an object is detected.

20 Claims, 10 Drawing Sheets

(56) References Cited

U.S. PATENT DOCUMENTS

| | | | |
|---|---|---|---|
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,981,789 B2 | 1/2006 | Assinder et al. |
| 6,990,922 B2 | 1/2006 | Ichikawa et al. |
| 7,015,893 B2 | 3/2006 | Li et al. |
| 7,040,770 B1 | 5/2006 | Olijnyk et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,764,256 B2 | 7/2014 | Foote et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,586,526 B2 | 3/2017 | Pastrick et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0081915 A1* | 4/2012 | Foote ..................... B60R 1/12 |
| | | | 362/494 |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0198515 A1 | 7/2014 | Tulio et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0103543 A1* | 4/2015 | Pastrick ............ B60R 1/1207 |
| | | | 362/465 |
| 2015/0109602 A1 | 4/2015 | Martin et al. |
| 2015/0138789 A1 | 5/2015 | Singer et al. |
| 2015/0197184 A1* | 7/2015 | Salter ..................... F21V 9/40 |
| | | | 362/510 |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |

(56) References Cited

FOREIGN PATENT DOCUMENTS

| | | |
|---|---|---|
| EP | 1793261 A1 | 6/2007 |
| EP | 2778209 A1 | 9/2014 |
| JP | 62191246 A | 8/1987 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |
| WO | 2016012651 A1 | 1/2016 |

* cited by examiner

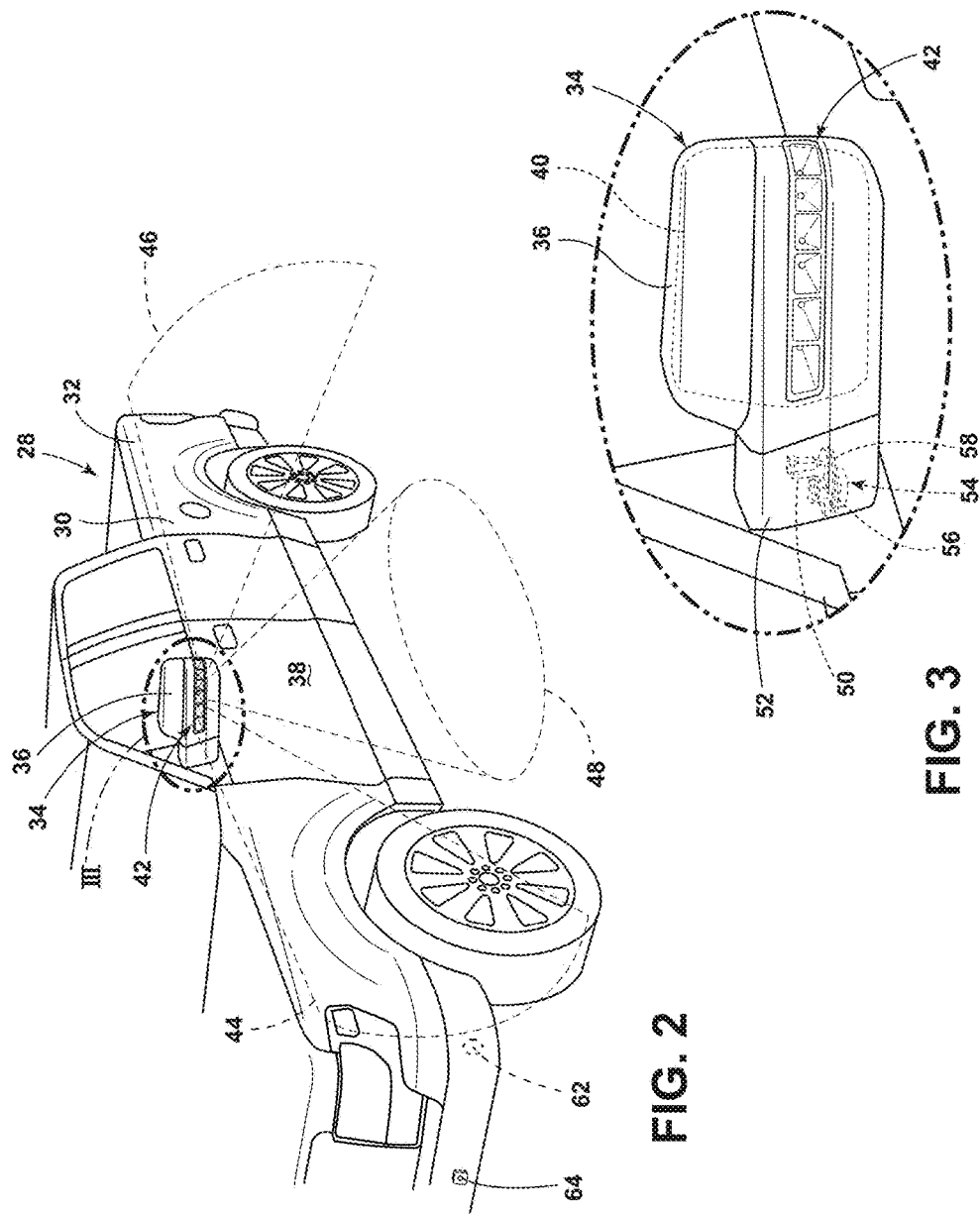

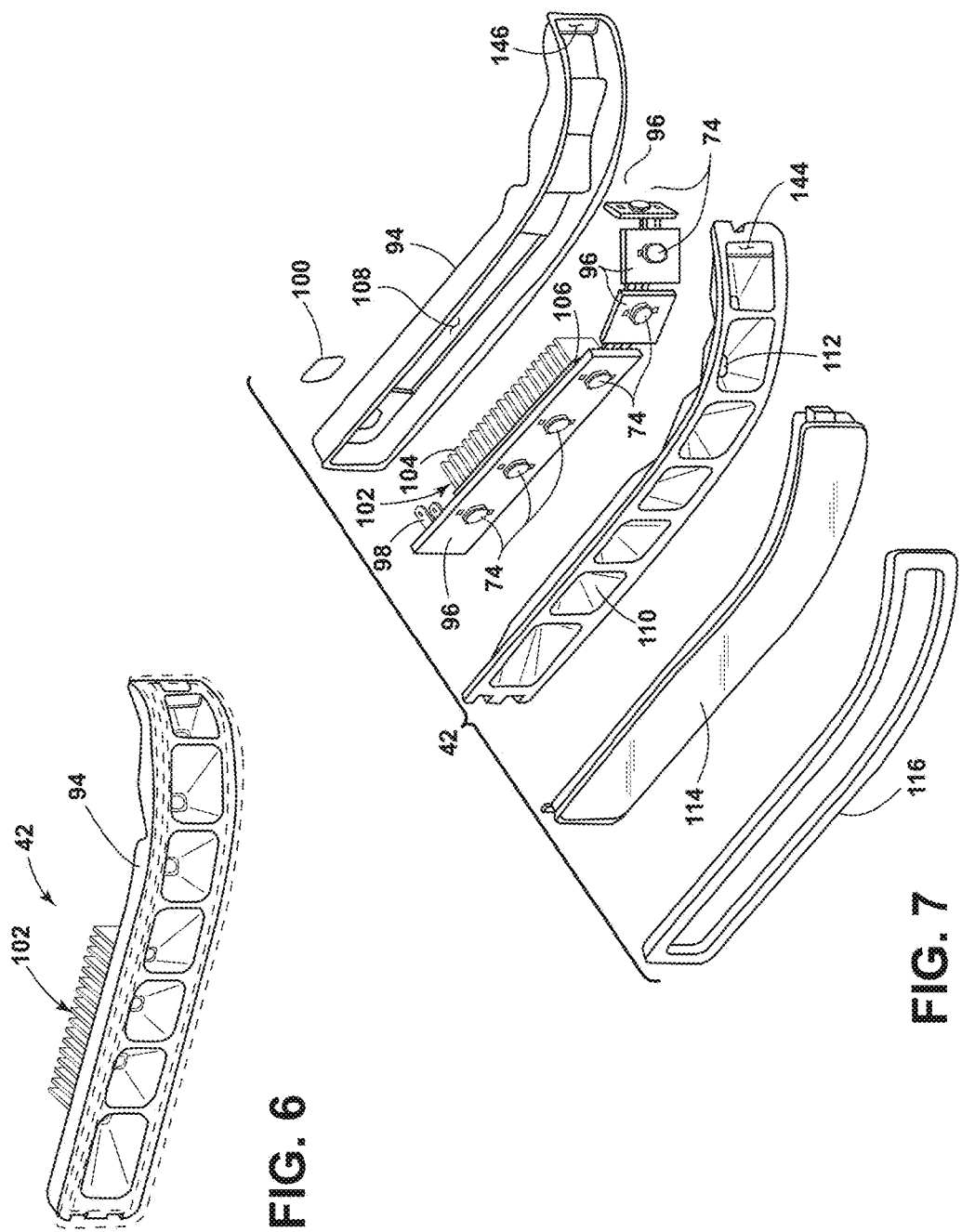

VEHICLE LAMP ASSEMBLY

FIELD OF THE INVENTION

The present disclosure generally relates to vehicle lamps, and more particularly, to vehicle lamps disposed around an exterior of a vehicle.

BACKGROUND OF THE INVENTION

Lamp assemblies are commonly employed in vehicles to provide various lighting functions. For some vehicles, it may be desirable to have a more efficient lamp assembly that may be capable of providing additional illumination proximate the vehicle.

SUMMARY OF THE INVENTION

According to one aspect of the present disclosure, a vehicle mirror assembly is disclosed. The vehicle includes a housing operable between a deployed position and a folded position. A lamp assembly has a first light source configured to direct light rearwardly of the housing and a second light source configured to direct light forwardly of the housing. The housing is configured to move from the deployed position to the folded position when an object is detected.

According to another aspect of the present disclosure, a vehicle mirror assembly is provided herein. The vehicle mirror assembly includes a housing operable between a deployed position and a folded position. A lamp assembly has a light source configured to direct light forwardly and rearwardly of the housing when the housing is in the deployed and folded positions.

According to yet another aspect of the present disclosure, a lamp assembly for a vehicle is disclosed. The lamp assembly includes a printed circuit board (PCB) attached to a rear housing. A reflector is operably coupled with a light source disposed on the PCB. A reflector and a lens are each operably coupled to a light source disposed on the PCB. The housing is moved between a first position and a second position and the light source directs emitted light forwardly and rearwardly of the rear housing in the first and the second positions.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a front perspective view of an automotive vehicle employing a lamp assembly in an exterior mirror assembly of the vehicle, according to some examples;

FIG. 3 is an enlarged view of section III of FIG. 2 illustrating the exterior mirror assembly with a plurality of light sources disposed within the lamp assembly;

FIG. 6 is a front perspective view of the lamp assembly, according to some examples;

FIG. 7 is a front exploded view of the lamp assembly, according to some examples;

DETAILED DESCRIPTION OF THE PREFERRED EXAMPLES

Figure 1A:
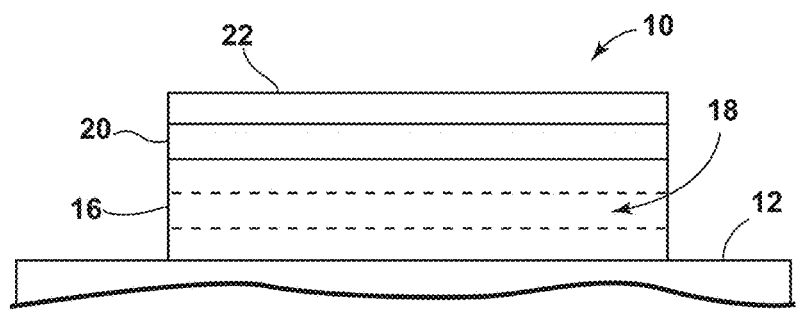
FIG. 1A is a side view of a luminescent structure rendered as a coating, according to some examples.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes a lamp assembly that may be integrated within a side mirror assembly of a vehicle. The lamp assembly may provide illumination along the vehicle from the side mirror assembly. One or more light sources within the lamp assembly may illuminate in response to various inputs in a forwardly, rearward, outwardly, and/or downwardly direction. The mirror assembly may be moved between a deployed position (first position) and a folded position (second position) in response to detection of an object and/or person proximate the vehicle. The lamp assembly may be operably coupled with one or more phosphorescent and/or luminescent structures to luminesce in response to predefined events. The one or more luminescent structures may be configured to convert emitted light received from an associated light source and re-emit the light at a different wavelength generally found in the visible spectrum.

Figure 1B:
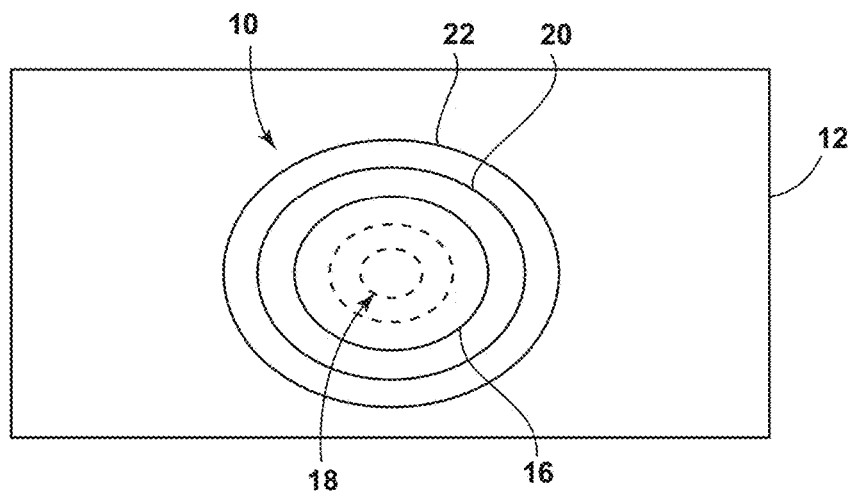
FIG. 1B is a top view of a luminescent structure rendered as a discrete particle, according to some examples.
Figure 1C:
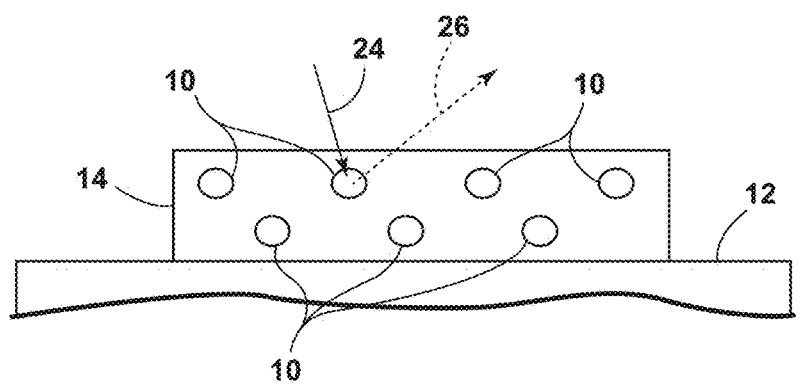
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^4$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

Figure 4:
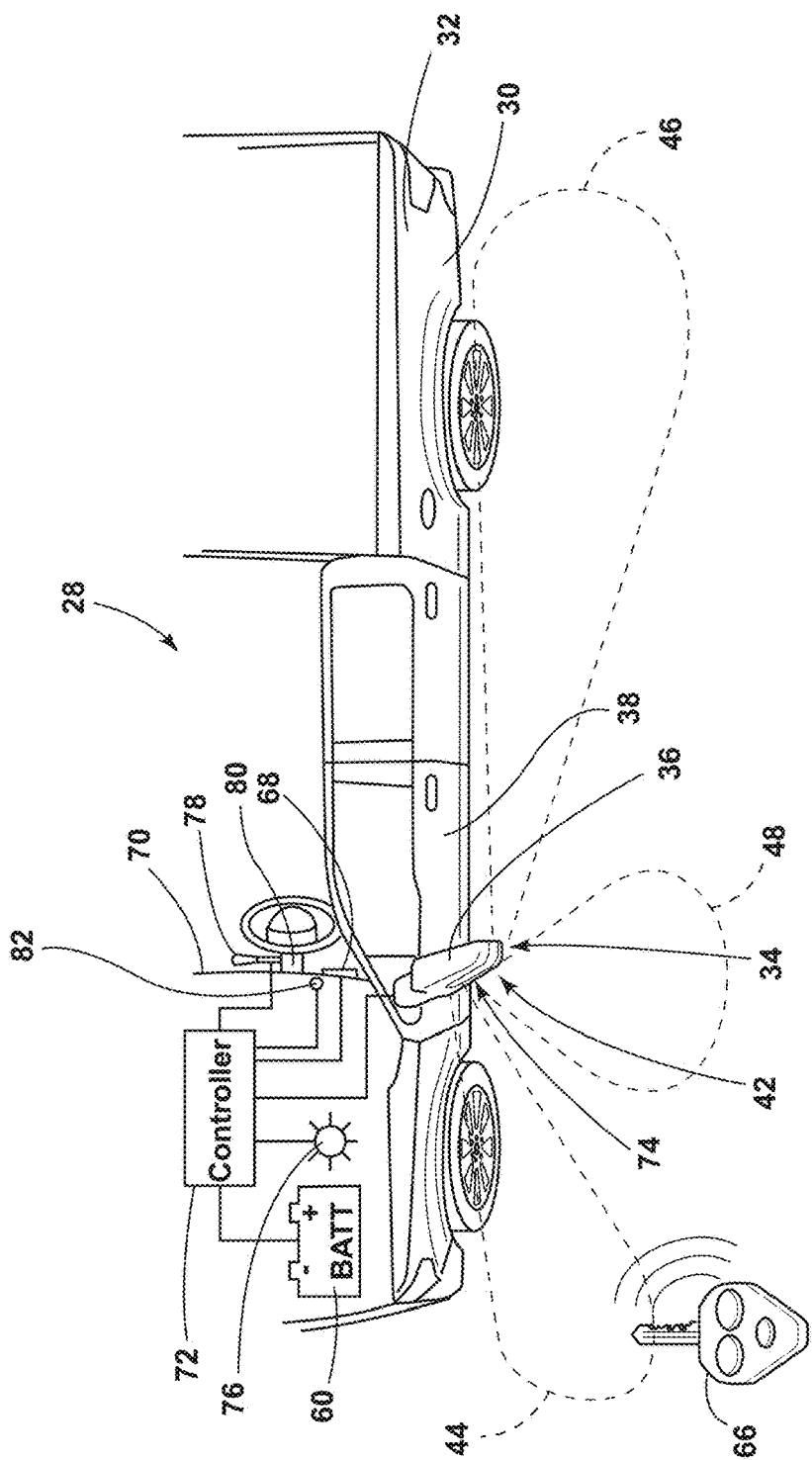
FIG. 4 is top perspective view of the vehicle employing the lamp assembly, according to some examples.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from one or more light sources 74 (FIG. 4). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light sources 74). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 $mcd/m^2$ after a period of 10 minutes. Additionally, the long-persistence luminescent material 18 may be operable to emit light above or at an intensity of 0.32 $mcd/m^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources 74 that emit the emitted light 24, including, but not limited to, natural light sources (e.g., the sun) and/or any artificial one or more light sources 74. The periodic absorption of the emitted light 24 from any excitation source may provide for a substantially sustained charge of the long-persistence luminescent material 18 to provide for consistent passive illumination. In various examples, a light sensor 82 (FIG. 4) may monitor the illumination intensity of the luminescent structure 10 and actuate an excitation source when the illumination intensity falls below 0.32 $mcd/m^2$, or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring to FIGS. 2 and 3, a vehicle is illustrated according to some examples and is referenced generally by numeral 28. The vehicle 28 includes a vehicle body 30 with an exterior 32, as depicted. A sideview mirror assembly 34 includes a housing 36 mounted to the vehicle body 30, for example, to a vehicle door 38. The mirror assembly 34 includes a sideview mirror 40 (FIG. 3) for assisting a driver in viewing a region reflected upon the mirror 40. The housing 36 may include a tilt actuator (not shown) therein for providing an occupant of the vehicle 28 with an adjustable view while utilizing the mirror 40.

The mirror assembly 34 further includes a lamp assembly 42 oriented upon the housing 36 for collectively illuminating an area adjacent to the vehicle exterior 32. Exemplary illumination zones 44, 46, 48 provided by the lamp assembly 42 are depicted in FIG. 2. The illumination zones 44, 46, 48 may be utilized in absence of ambient light, which may be beneficial for performing work or maintenance outside the vehicle 28. For example, the first illumination zone 44 may be forward of the side mirror assembly 34, the second illumination zone 46 may be rearward of the side mirror assembly 34, and the third illumination zone 48 may illuminate a ground surface proximate the vehicle 28.

The housing 36 may be operably coupled with a pivot assembly 50 that is used to connect the housing 36 to a mirror bracket 52. The bracket 52 is secured to the vehicle 28 and the pivot assembly 50 is used to connect the housing 36 securely to the vehicle 28. While the mirror assembly 34 is illustrated on a driver's side portion of the vehicle 28, it will be understood that the mirror assembly 34 described herein may be disposed on either lateral side portion, or any other portion, of the vehicle 28 without departing from the scope of the present disclosure.

With further reference to FIGS. 2 and 3, the housing 36 may be operable between a deployed, or first, position and a folded, or second, position. In some examples, the pivot assembly 50 is electronically controlled and includes a pivot drive assembly 54 adapted for supporting a drive motor 56 and a transmission assembly 58. The drive motor 56 may be electrically powered by a power source 60 (FIG. 4), and controlled by a suitable switching device, which may incorporate digital microprocessor-based logic devices. The transmission assembly 58 is adapted to convert the rotation of the drive motor shaft (not shown) to control the rotation of the housing 36 about an axis of rotation. The drive motor 56 may alter the position of the mirror assembly 34 automatically based on a predefined vehicle event, such as a vehicle exterior sensor 62 and/or a camera 64 detecting that an object 92 (FIG. 5) may contact the side mirror assembly 34 in the deployed position, an engine of the vehicle 28 being disposed in the ON/OFF state and/or a welcome or farewell sequence, meaning that rotation of the mirror assembly 34 may occur as an occupant of the vehicle 28 leaves and/or approaches the vehicle 28 employing the mirror assembly 34. Additionally, and/or alternatively, the mirror assembly 34 may be rotated based on any other predefined event without departing from the scope of the present disclosure. Additionally still, the mirror assembly 34 may be rotated based on actuation of a switch by an occupant of the vehicle 28. The switch may be disposed within the vehicle 28 and/or on a key fob 66 (FIG. 4) of the vehicle 28. Additionally still, the mirror assembly 34 may be operably coupled with any other system and/or sensor within the vehicle 28 such that the mirror assembly 34 may be rotated based on actuation of that system or sensor.

Referring to FIG. 4, the vehicle 28 includes the power source 60, such as a battery, for powering the lamp assembly 42. A switch 68 may be mounted on a cockpit module 70 of the vehicle 28. A controller 72 such as a body control unit is mounted to the vehicle 28 in communication with the battery 60, the switch 68, and the lamp assembly 42 for illuminating one or more light sources 74 when the switch 68 is manually actuated. Therefore, the illumination zones 44, 46, 48 may be manually and independently controlled. Additionally, and/or alternative, the controller 72 may be configured to activate various light sources 74 based on predefined events, such as during travel of the vehicle 28 in a specific direction (e.g., reverse) and/or when the vehicle 28 is operated below a predefined speed.

The vehicle 28 may also include a receiver 76 in communication with the controller 72. The controller 72 may be configured to power and consequently illuminate the plurality of light sources 74 upon receipt of input indicative of a signal transmitted from a key fob 66 associated with the vehicle 28. Therefore, the operation of the lamp assemblies 42 may be controlled from the key fob 66 of the user.

The lamp assembly 42 may also include signal indicators, such as amber light sources 74 to visually communicate to other drivers an intention to turn. Accordingly, a stalk switch 68 may be provided on a steering column 80 of the vehicle 28. The stalk switch 68 is in communication with the controller 72 such that actuation of the stalk switch 68 results in intermittent illumination of the signal indicators.

With further reference to FIG. 4, in some examples, the vehicle 28 includes a light sensor 82 that may be utilized for varying the intensity of emitted light 24 emanated from the lamp assembly 42. The light sensor 82 detects ambient lighting conditions, such as whether the vehicle 28 is in day-like conditions (i.e., higher light level conditions) and/or whether the vehicle 28 is in night-like conditions (i.e., lower light level conditions). The light sensor 82 can be of any suitable type and can detect the day-like and night-like conditions in any suitable fashion. According to some examples, the colors of light and/or intensities of the emitted light 24 from the lamp assembly 42 may be varied based on the detected conditions. The light sensor 82 may be integrated into the vehicle 28 or into the mirror assembly 34. Moreover, the intensity of emitted light 24 may additionally, or alternatively, be varied with the initiation of the vehicle's headlights or any other vehicle system.

Figure 5:
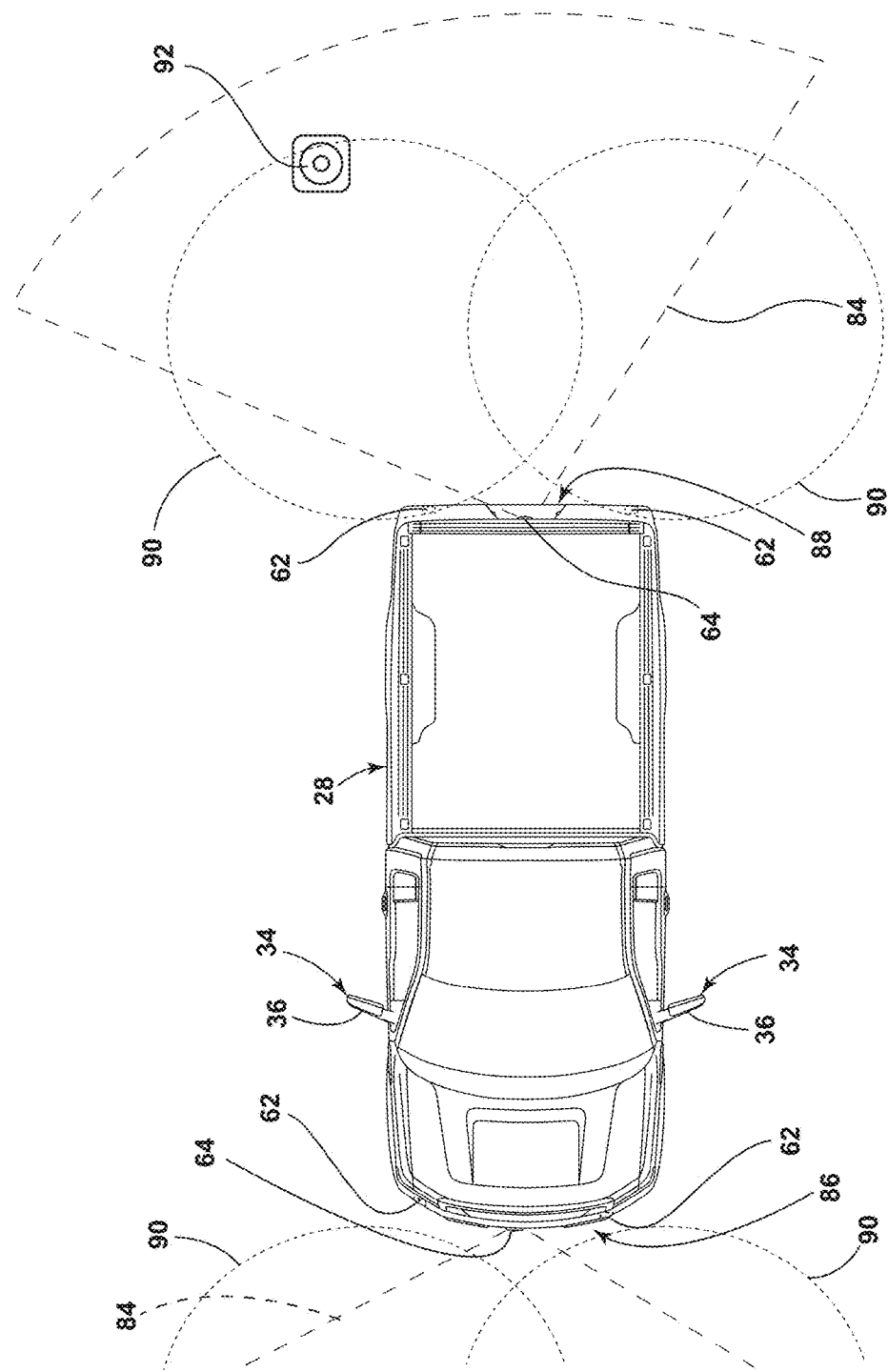
FIG. 5 is a top plan view of the vehicle having a plurality of exterior sensors and a pair of cameras, according to some examples.

Referring to FIG. 5, the vehicle 28 may include both exterior sensors 62 and/or one or more cameras 64, or any other vision-based device. The camera 64 includes an image sensor having an area type image sensor, such as a CCD or a CMOS image sensor and image-capturing optics (not shown), and captures an image of an imaging field of view 84 defined by the image-capturing optics. In some instances, a first camera 64 may be disposed on a front portion 86 of the vehicle and a second camera 64 may be located proximate an upper region of the vehicle tailgate 90 at a rear portion 88 of the vehicle 28. The camera 64 proximate the front portion 86 of the vehicle 28 is oriented to capture one or more images forwardly of the vehicle 28 while the camera 64 proximate the rear portion 88 of the vehicle 28 is oriented to capture one or more images rearwardly of the vehicle 28. The images may be analyzed to determine if the vehicle 28 is approaching an object 92 and/or person. Likewise, the one or more exterior sensors 62 may generate a detection field 90. The exterior sensor 62 may be configured as an ultrasonic sensor, a radar sensor, a LIDAR sensor, or any other type of sensor known in the art.

The one or more cameras 64 and/or one or more exterior sensors 62 may be utilized for determining the presence of an object 92 and/or person. If an object 92 and/or person is detected, and the vehicle 28 determines that the object 92 may contact the side mirror assembly 34, or the vehicle 28, the side mirror assembly 34 on the same side of the vehicle 28 as the object 92 and/or person may automatically move to the folded position. In some cases, the automatic folding of the mirror may occur when the vehicle 28 is moving below a predefined speed and the object 92 and/or person is determined to possibly contact the side mirror assembly 34. If the predetermined speed is exceeded, the side mirror assembly 34 may stay in a deployed position. Moreover, the lamp assembly 42 may provide illumination along the side portions of the vehicle 28 while in the folded and deployed positions. In some instances, the lamp assembly 42 provides illumination along the vehicle 28 when a transmission of the vehicle 28 is placed in reverse and/or the vehicle 28 is moving below a predefined speed. The lamp assembly 42 may illuminate the various lamp assemblies therein in night-like conditions.

Referring to FIGS. 6 and 7, the lamp assembly 42, according to some examples, includes a rear housing 94 for being fastened to the mirror housing 36. The rear housing 94 supports a plurality of printed circuit boards (PCBs) 96 each oriented along the rear housing 94 and having control circuitry including drive circuitry for controlling activation and deactivation of the plurality of light sources 74. The PCBs 96 may be any type of circuit board including, but not limited to, any flexible PCB and/or rigid PCB. Alternatively, a single PCB 96 may be disposed within the lamp assembly 42 that supports each light source 74. Each PCB 96 may include one or more light sources 74, which may be configured as a spotlight, a signal indicator, or any other desired type of light. A power terminal 98 is provided on the plurality of PCBs 96 for passing through a seal 100 for electrical connection with a corresponding receptacle within the mirror assembly 34.

With respect to the examples described herein, the light sources 74 may each be configured to emit visible and/or non-visible light, such as blue light, UV light, infrared, and/or violet light and may include any form of light source. For example, the light sources 74 may be fluorescent lights, light emitting diodes (LEDs), organic LEDs (OLEDs), polymer LEDs (PLEDs), laser diodes, quantum dot LEDs (QD-LEDs), solid-state lights, a hybrid of these or any other similar device, or any other form of light source. Further, various types of LEDs are suitable for use as the light source 74 including, but not limited to, top-emitting LEDs, side-emitting LEDs, and others. Moreover, according to various examples, multicolored light sources, such as Red, Green, and Blue (RGB) LEDs that employ red, green, and blue LED packaging may be used to generate various desired colors of light output from a single light source, according to known light color mixing techniques.

Referring again to FIGS. 6 and 7, as the lamp assembly 42 is being used, the light sources 74, while producing emitted light 24 also emit heat. As heat is emitted from the light sources 74, a heatsink 102 captures at least a portion of this heat. The captured heat is temporarily retained within elongated members 104 of the heatsink 102. The captured heat within the heatsink 102 migrates to areas that have a lower temperature than the heatsink 102. As such, the heatsink 102, after absorbing heat from the light sources 74, exchanges or transfers heat to cooler regions in and around the side mirror assembly 34. In some instances, the heat transferred from the elongated members 104 can serve to warm the side view mirror above the freezing point of water to melt snow and ice that may collect thereon. Also, the heat transferred to the side view mirror can serve to raise the temperature of the side view mirror above the dew point of the surrounding air, such that condensation that may collect on the side view mirror can dissipate, evaporate, or otherwise be removed from the surface of the side view mirror as a result of the heat from the elongated members 104 of the heatsink 102. In some examples, the rear housing 94 may define a void 108 through which the heatsink 102 may extend. Accordingly, the heatsink 102 may dissipate heat into an interior of the housing 36 to increase the efficiency of the heatsink 102.

In the various examples, the elongated members 104 of the heatsink 102 can extend generally perpendicular from a back portion 106 of the heatsink 102. In such an example, the elongated members 104 can be substantially linear, or can include various angled and/or curved portions. It is contemplated that, in various instances, the elongated members 104 can extend in an angled configuration or a curved configuration, or both, relative to the back portion 106 of the heatsink 102. It is further contemplated that each elongated member 104 can have configurations that can include, but are not limited to, linear, curved, angled, and trapezoidal, among other configurations. Additionally, various cross members can be included that extend across the elongated members 104 to add structure to the elongated members 104 and also add surface area through which heat can be transferred from the lamp assembly 42. It is also contemplated that the elongated members 104 may not have a consistent length. Such configurations may include a triangular profile, a trapezoidal profile, a curved profile, an irregular profile, among other similarly shaped profiles. Various examples of the heatsink 102 may also include more than one row of elongated members 104, such as an inner layer and outer layer of elongated members 104.

In the various examples, the heatsink 102 can be made of various materials that have a high thermal conductivity. Such materials can include, but are not limited to, aluminum, aluminum alloys, copper, composite materials that incorporate materials having a high thermal conductivity, combinations thereof, and other materials that are at least partially thermally conductive.

With further reference to FIGS. 6 and 7, a plurality of reflectors 110 is provided within the lamp assembly 42. The reflectors 110 may be formed integrally as depicted and each includes an aperture 112 aligned with the corresponding light sources 74. The reflectors 110 are utilized for reflecting and redirecting emitted light 24 from the light sources 74 for focusing the illumination to one or more illumination zones 44, 46, 48. The reflectors 110 and corresponding light sources 74 are oriented to convey light forward, laterally outward, downward, and/or rearward of the mirror assembly 34 with respect to the vehicle 28 for illuminating the expanded illumination zones 44, 46, 48 and/or for conveying a turn signal to viewers in various directions with respect to the vehicle 28. In some examples, an outboard light source may be rearward facing and can be controlled and operated separately for providing clearance illumination rearward of the mirror assembly 34.

A translucent lens cover 114 and a gasket 116 are also provided in the lamp assembly 42 for isolating various components of the lamp assembly 42 from external contaminants and weather. The lens cover 114 may include optics thereon. For example, the lens cover 114 may be configured with a Fresnel lens, a pillow optic, and/or any other type of lens or optic that is configured to disperse, concentrate, and/or otherwise direct light emitted from the lamp assembly 42 there-through in any desired manner. The optics may assist in directing emitted light 24 in a desired direction, such as rearward of the mirror assembly 34.

Referring still to FIGS. 6 and 7, in some examples, a lens 146 may be disposed within a portion of the rear housing 94. Moreover, one or more reflectors 110 may define an aperture 144 therein that allow emitted light 24 to exit therethrough. The emitted light 24 may then be directed through the lens 146 and outward from the mirror assembly 34. In some instances, the lens 146 may be directed rearwardly, when the mirror assembly 34 is in a deployed position, such that the emitted light 24 directed through the lens 146 emanates in a rearward direction along the vehicle 28.

Figure 8:
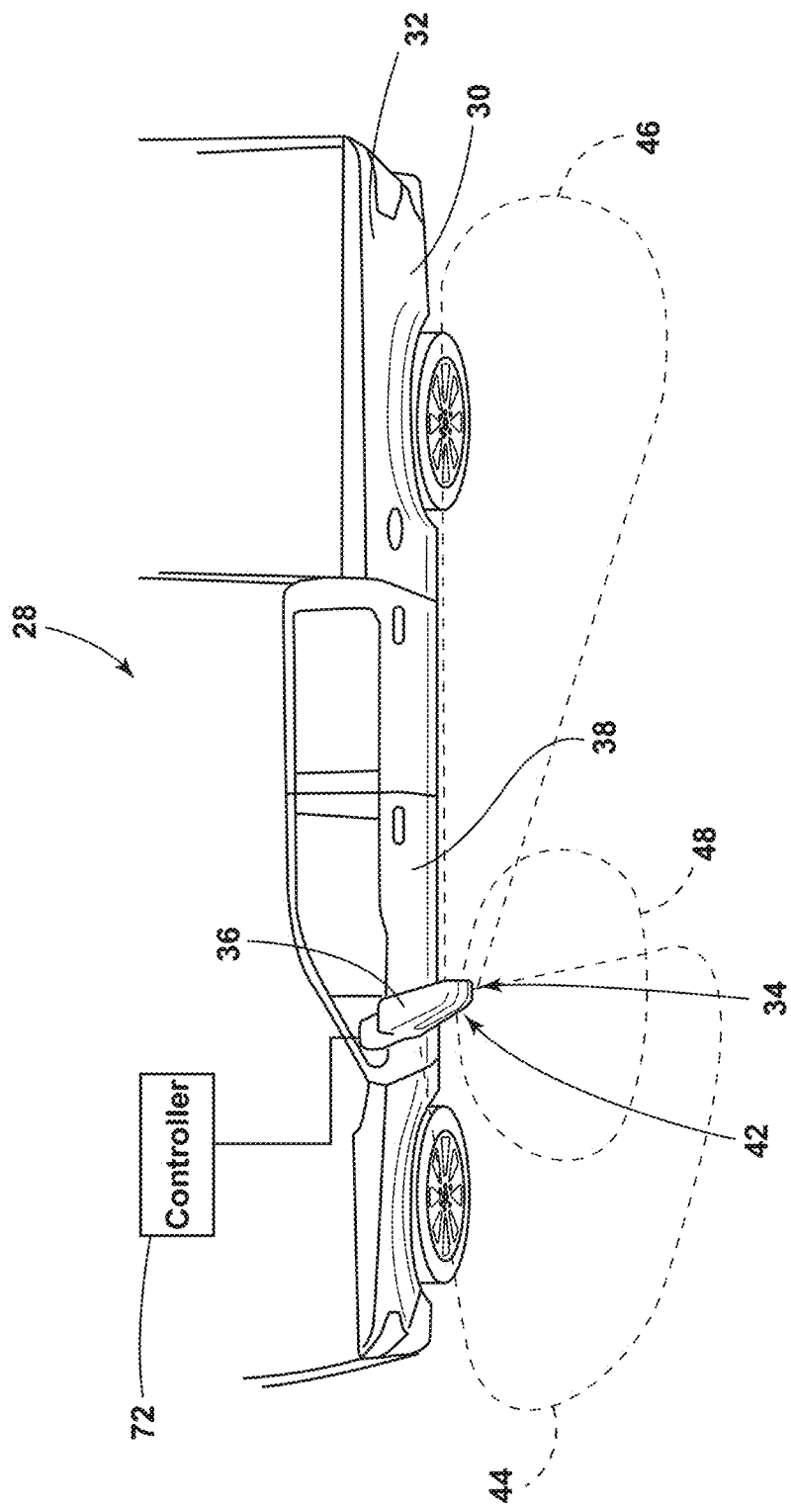
FIG. 8 is a top perspective view of the vehicle with the side mirror assembly in a deployed position.

Referring to FIG. 8, when the side mirror assembly 34 is in the deployed position, the outboard light source may be rearward facing, and/or optics may direct emitted light 24 rearward, to create a rearwardly directed illumination zone 46. It will be appreciated, however, that the lamp assembly 42 may use any structure for directing emitted light 24 rearward. For example, the side mirror assembly 34 may include a light output window through which the rearwardly emitted light 24 may be directed.

In some examples, the lamp assembly 42 may produce rearward directed emitted light 24 when the vehicle transmission is placed in reverse. Additionally, and/or alternatively, the lamp assembly 42 direct emitted light 24 rearward when the vehicle 28 is moving in a forward direction at or below a predefined speed. Moreover, the lamp assembly 42 may direct emitted light 24 rearward when the exterior sensors 62 and/or cameras 64 detect an object 92 within a predefined distance of the vehicle 28. The object 92 may be rearwardly and/or adjacent to the vehicle 28 and potentially illuminated by the lamp assembly 42.

In addition to the rearwardly directed illumination zone 46, the lamp assembly 42 may also direct emitted light 24 towards the ground surface proximate the vehicle 28 to form a puddle lamp. The puddle lamp may be illuminated in response to receipt of a lock/unlock signal 118 (FIG. 12) from the key fob 66, the vehicle 28 initiating movement below a predefined speed, and/or for any other desired reason. The lamp assembly 42 may additionally and/or alternatively create a forwardly and/or outwardly extending illumination zone 44.

Figure 9:
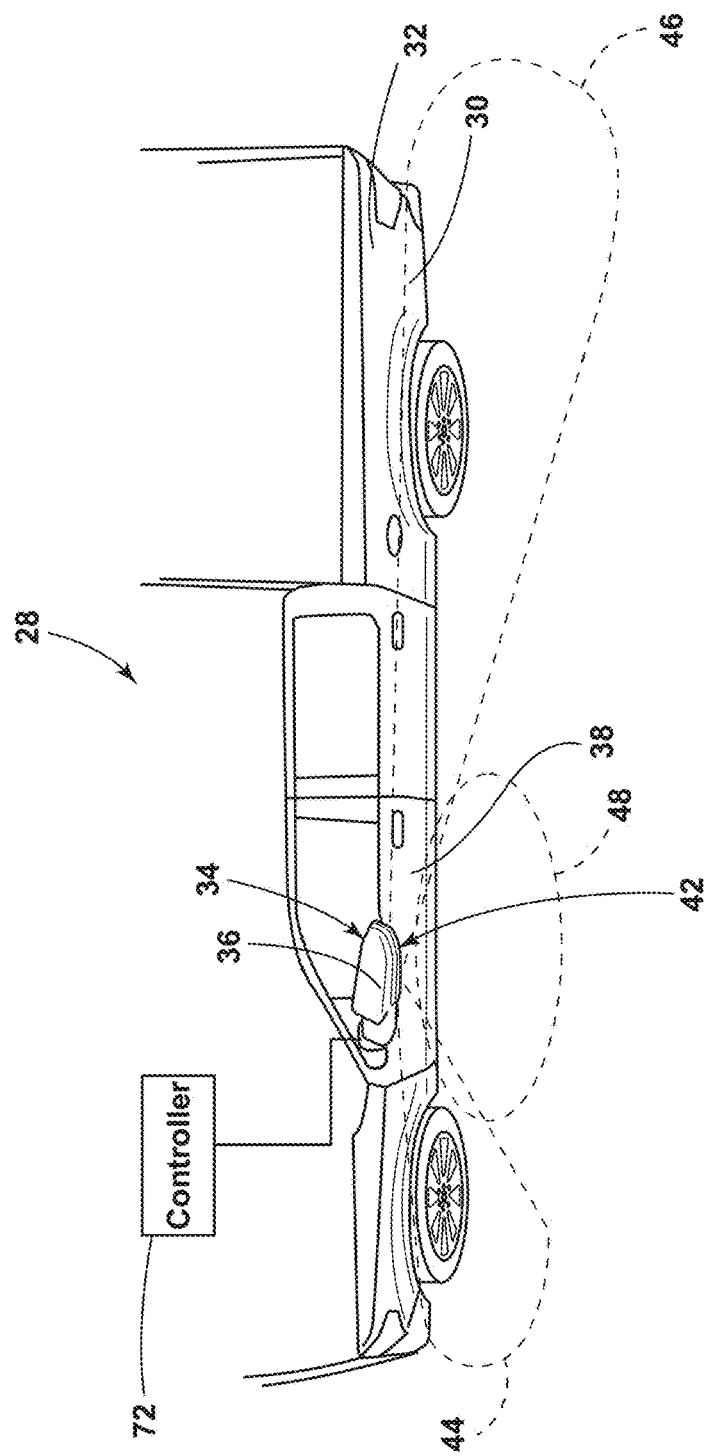
FIG. 9 is a top perspective view of the vehicle with the side mirror assembly in a folded position, according to some examples.

Referring to FIG. 9, the lamp assembly 42 may be configured to emit light forwardly and/or rearwardly while the side mirror assembly 34 is in the folded position. In some examples, optics may be utilized for splitting emitted light 24 from a single light source 74 in two opposing directions. In other examples, a first light source 74 and the reflector 110 direct emitted light 24 in a first direction and a second light source 74 and the reflector 110 direct emitted light 24 in an opposing direction. Accordingly, the lamp assembly 42 may provide forwardly and/or rearwardly directed illumination zones 44, 46, 48 while the side mirror assembly 34 is in the folded and/or deployed position. Moreover, as provided herein, the mirror may automatically move from the deployed position to the folded position when an object 92 is detected to be in close proximity to the vehicle 28. As provided herein, the automatic folding of the mirror may occur when the vehicle 28 is moving below a predefined speed and/or an object 92 (FIG. 5) is detected in close proximity to the vehicle 28.

The lamp assembly 42 may also illuminate the ground surface proximate the vehicle 28 while the side mirror assembly 34 is disposed in the folded position. Accordingly, the lamp assembly 42 may illuminate a portion of the vehicle 28 that is proximate the side mirror assembly 34 as well as forwardly and/or rearwardly of the side mirror assembly 34, possibly simultaneously.

Figure 10:
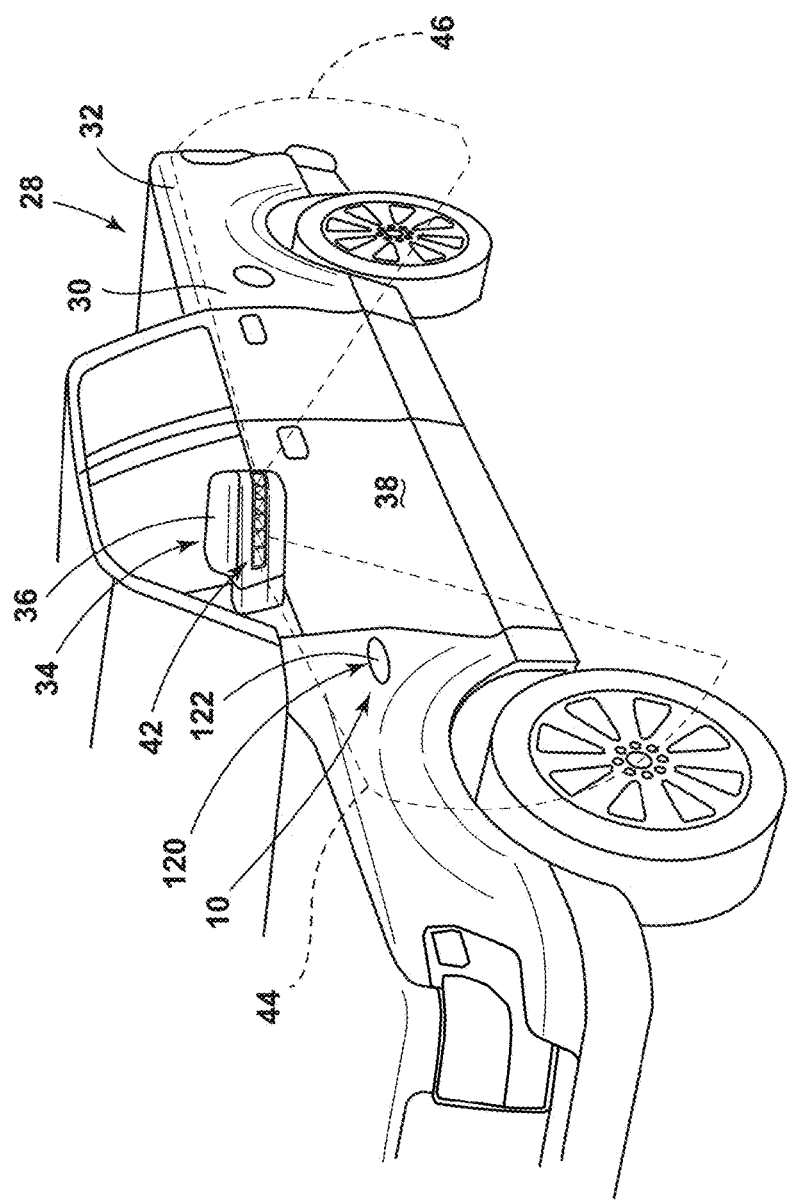
FIG. 10 is a front perspective view of the vehicle with a badge on the vehicle, according to some examples.
Figure 11:
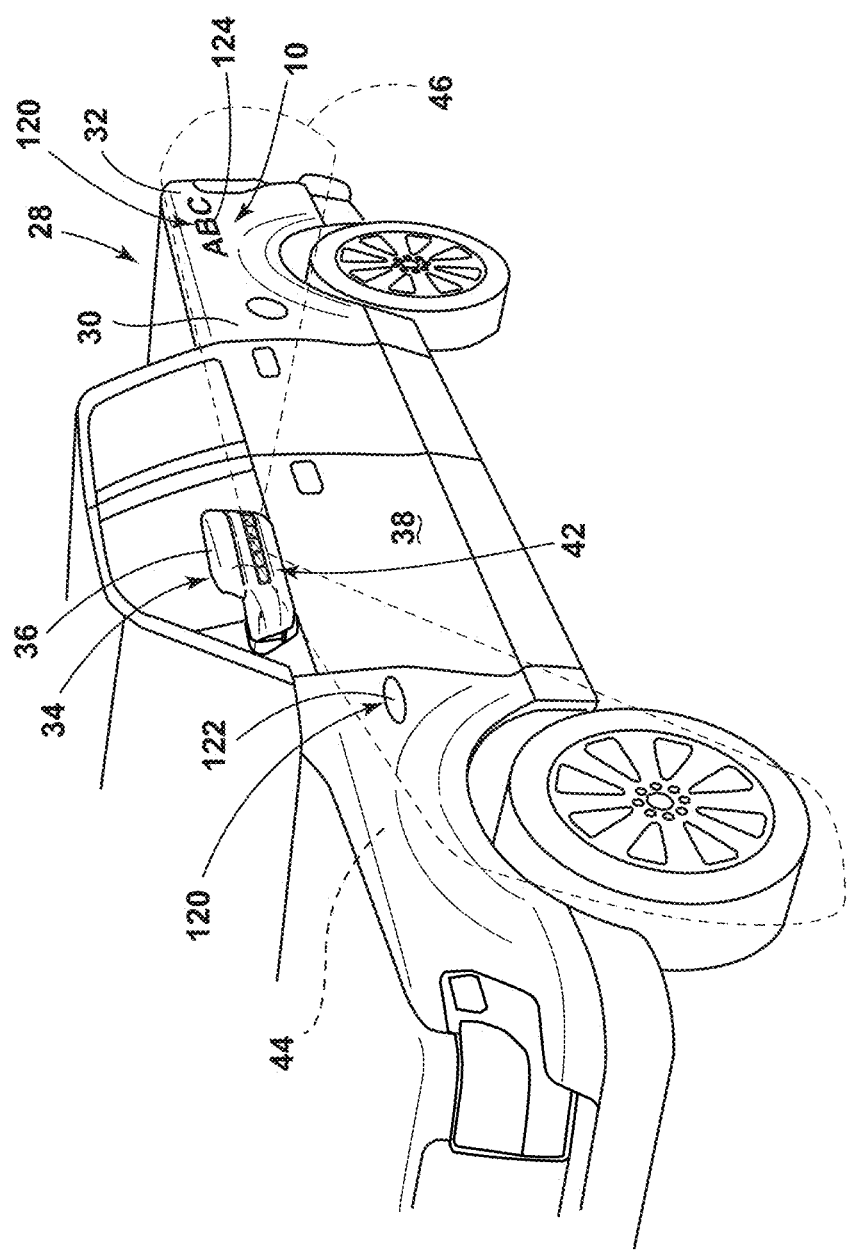
FIG. 11 is a front perspective view of the vehicle with a decal on the vehicle, according to some examples.

Referring to FIGS. 10 and 11, in some instances, the vehicle 28 may include the luminescent structure 10 on a body feature 120 thereof, such as a badge 122 and/or a decal 124. The lamp assembly 42 may be configured to direct emitted light 24 at the luminescent structure 10. In some instances, the luminescent structure 10 may be integrated within a paint and/or other decorative material that is disposed on the body feature 120. In operation, the luminescent structure 10 may exhibit a constant unicolor or multicolor illumination in response to receiving emitted light 24 from one or more of the light sources 74.

As described herein, the color of the converted light 26 may be dependent on the particular luminescent material 18 (FIG. 1) utilized in the luminescent structure 10. Additionally, a conversion capacity of the luminescent structure 10 may be significantly dependent on a concentration of the luminescent materials 18 utilized in the luminescent structure 10. By adjusting the range of intensities that may be emitted from the one or more light sources 74, the concentration and proportions of the luminescent materials 18 in the luminescent structure 10 and the types of luminescent materials 18 utilized in the luminescent structure 10 discussed herein may be operable to generate a range of color hues of outputted light by blending the emitted light 24 with the converted light 26. It is also contemplated that the intensity of each one or more light sources 74 may be varied simultaneously, or independently, from any number of other light sources 74.

Figure 12:
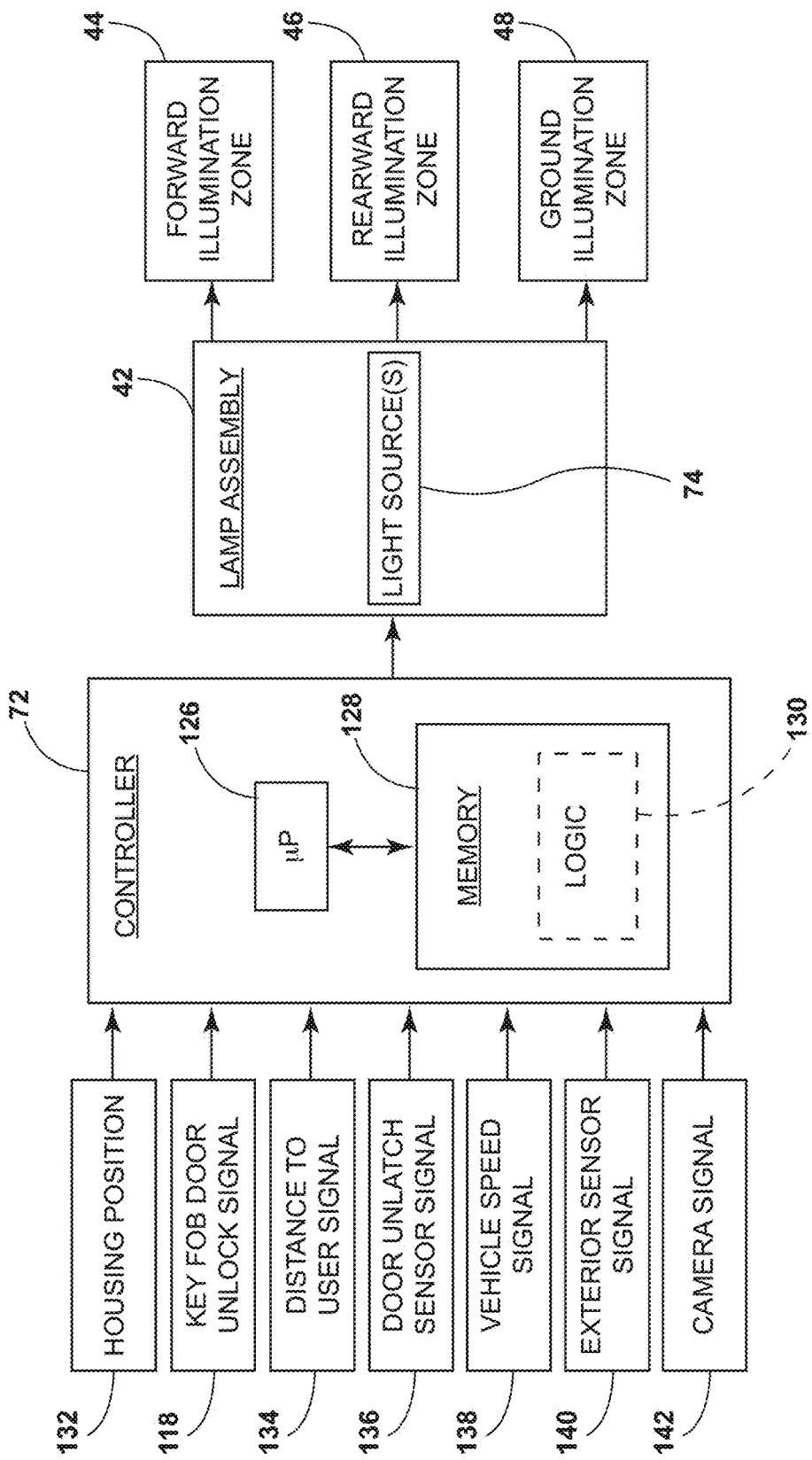
FIG. 12 is a block diagram showing a controller operably coupled to the lamp assembly, according to some examples.

Referring to FIG. 12, the lamp assembly 42 is operably coupled to the controller 72 receiving various inputs and controlling the lamp assembly 42 by applying signals to the light sources 74 within the lamp assembly 42. The controller 72 may include a microprocessor 126 and memory 128 as illustrated, according to some examples. It should be appreciated that the controller 72 may include control circuitry such as analog and/or digital control circuitry. Logic 130 is stored within memory 128 and executed by the microprocessor 126 for processing the various inputs and controlling each of the plurality of the light sources 74, as described herein. The inputs to the controller 72 may include a housing position signal 132, the key fob 66 door unlock signal 118, a distance to user signal 134, a door unlatch signal 136, a vehicle speed signal 138, an exterior sensor signal 140, a camera signal 142, and/or any other signal.

The controller 72 may determine whether the housing 36 is in the deployed or folded position and activate and/or deactivate the appropriate light sources 74 based on the position. For example, when the housing 36 is disposed in the folded position, the controller 72 may illuminate the forward illumination zone 44, the rearward illumination zone 46, and/or the ground illumination zone 48. In such instances, the forward illumination zone 44 and/or rearward illumination zone 46 may illuminate an area along a side portion of the vehicle 28 with the side mirror assembly 34 in the deployed and/or folded positions. The ground illumination zone 48 may form a puddle lamp adjacent the vehicle 28.

Additionally, the controller 72 receives the door lock/unlock signal 118 and/or the distance to user signal 134, which is a distance that the occupant is detected from the vehicle 28. The distance to the user signal may be generated by computing distance between the vehicle 28 and the key fob 66, according to some examples. Additionally, or alternatively, the controller 72 may include one or more of wireless communication transceivers that may be configured to interact with an electronic device. The wireless communication transceivers may communicate with the electronic device over a wireless signal (e.g., radio frequency). In one non-limiting example, the wireless communication transceivers may be a Bluetooth™ RN4020 module, or an RN4020 Bluetooth™ low energy PICtail board configured to communicate with the electronic device using Bluetooth™ low energy signals. The wireless communication transceivers may include a transmitter and a receiver to transmit and receive wireless signals (e.g., Bluetooth™ signals) to and from the electronic device, to and from the lamp assembly 42 and/or to and from the vehicle 28. It will be appreciated that the wireless communication transceivers may utilize other forms of wireless communication between the electronic device and other wireless communication transceivers such as Wi-Fi™.

With further reference to FIG. 12, the controller 72 may receive a vehicle speed signal 138. The controller 72 may activate one or more light sources 74 within the lamp assembly 42 when the vehicle 28 is operated at or below a predefined speed, such as 3 miles per hour (mph). The controller 72 may additionally illuminate one or more light sources 74 in response to receiving an exterior sensor signal 140 and/or a camera signal 142 in which the exterior sensor 62 and/or the camera 64 detect a person or object 92 in close proximity to the vehicle 28. Additionally, when the exterior sensors 62 and/or cameras 64 detect an object 92 or person proximate the vehicle 28, the side mirror assemblies may automatically be placed in the folded position. Moreover, the automatic folding may occur when the vehicle 28 is moving forwardly and/or rearwardly below the predefined speed.

A variety of advantages may be derived from the use of the present disclosure. For example, use of the disclosed lamp assembly provides a unique aesthetic appearance to the vehicle. Moreover, the lamp assembly may provide lighting around the vehicle with the side mirror assembly in a folded and a deployed position. The side mirror assembly may be automatically moved between a deployed position and a folded position based on a vehicle speed and/or an object that is detected in close proximity to the vehicle. The lamp assembly may be manufactured at low costs when compared to standard vehicle lighting assemblies.

According to various examples, a vehicle mirror assembly is provided herein. The vehicle includes a housing operable between a deployed position and a folded position. A lamp assembly has a first light source configured to direct light rearwardly of the housing and a second light source configured to direct light forwardly of the housing. The housing is configured to move from the deployed position to the folded position when an object is detected. Examples of the vehicle mirror assembly can include any one or a combination of the following features:
- the object is detected by an exterior sensor disposed on a vehicle;
- the object is detected by a camera disposed on a vehicle;
- a first reflector operably coupled with the first light source and a second reflector operably coupled with the second light source;
- a third light source configured to emit light towards a ground surface proximate a vehicle;
- the first and second light sources emit light forwardly and rearwardly of the housing when the housing is in the folded position and the deployed position;
- a light sensor disposed on a vehicle and configured to detect an ambient light level, wherein the intensity of emitted light emanated from the lamp assembly is varied based on the detected light level;
- a luminescent structure disposed on a vehicle and excitable by emitted light from the lamp assembly;
- the lamp assembly includes a rear housing and a heatsink configured to capture at least a portion of heat generated by the first or second light source, the heatsink extending through the housing;
- the heat transferred from the heatsink is configured to warm a mirror within the housing; and/or
- emitted light from the first or second light source is directed in two opposing directions when the housing is disposed in the folded position Moreover, a method of indicating an operational mode of a vehicle is provided herein. The method includes positioning a housing that is operable between a deployed position and a folded position on a vehicle. A lamp assembly having a first light source configured to direct light rearwardly of the housing and a second light source configured to direct light forwardly of the housing is activated when the housing is moved from deployed position to the folded position or when an object is detected.

According to some examples, a vehicle mirror assembly is provided herein. The vehicle mirror assembly includes a housing operable between a deployed position and a folded position. A lamp assembly has a light source configured to direct light forwardly and rearwardly of the housing when the housing is in the deployed and folded positions. Examples of the vehicle mirror assembly can include any one or a combination of the following features:
- an exterior sensor disposed on a vehicle and configured to detect an object proximate the vehicle, wherein the housing moves from the deployed to the folded position when the object is detected and the vehicle is moving below a predefined speed; and/or
- a camera disposed on a vehicle and configured to detect an object proximate the vehicle, wherein the housing moves from the deployed to the folded position when the object is detected and the vehicle is moving below a predefined speed.

According to other examples, a lamp assembly for a vehicle is disclosed. The lamp assembly includes a printed circuit board (PCB) attached to a rear housing. A reflector is operably coupled with a light source disposed on the PCB. A reflector and a lens are each operably coupled to a light source disposed on the PCB. The housing is moved between a first position and a second position and the light source directs emitted light forwardly and rearwardly of the rear housing in the first and the second positions. Examples of the lamp assembly can include any one or a combination of the following features:
- the rear housing is coupled to a housing of a vehicle mirror assembly;
- the housing of the vehicle mirror assembly moves between the first position and the second position;
- a heatsink disposed within the housing of the vehicle mirror assembly and configured to capture at least a portion of the heat generated by the light source; and/or
- the housing of the vehicle mirror assembly moves from the first position to the second position when an object is proximate a vehicle and the vehicle is moving below a predefined speed.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle mirror assembly, comprising:
   a housing on a side of a vehicle and operable between a deployed position and a folded position; and
   a lamp assembly in the housing having a first light source configured to direct light rearwardly of the housing and a second light source configured to direct light forwardly of the housing, wherein the housing is configured to move from the deployed position to the folded position when an object is detected, wherein the lamp assembly illuminates a substantial area of the side of the vehicle when the housing is in the folded position, and wherein the lamp assembly illuminates a greater portion of the side of the vehicle in the folded position than in the deployed position.

2. The vehicle mirror assembly of claim 1, wherein the object is detected by an exterior sensor disposed on the vehicle.

3. The vehicle mirror assembly of claim 1, wherein the object is detected by a camera disposed on the vehicle.

4. The vehicle mirror assembly of claim 1, further comprising:
   a first reflector operably coupled with the first light source and a second reflector operably coupled with the second light source.

5. The vehicle mirror assembly of claim 1, further comprising:
   a third light source configured to emit light towards a ground surface proximate the vehicle.

6. The vehicle mirror assembly of claim 5, wherein the side mirror housing is moved from the deployed position to the folded position when the vehicle moves below a predefined speed.

7. The vehicle mirror assembly of claim 5, wherein the first and second light sources emit light forwardly and rearwardly of the housing when the housing is in the folded position and the deployed position.

8. The vehicle mirror assembly of claim 1, further comprising:
   a light sensor disposed on the vehicle and configured to detect an ambient light level, wherein the intensity of emitted light emanated from the lamp assembly is varied based on the detected light level.

9. The vehicle mirror assembly of claim 8, wherein the lamp assembly includes a rear housing and a heatsink configured to capture at least a portion of heat generated by the first or second light source, the heatsink extending through the housing.

10. The vehicle mirror assembly of claim 9, wherein the heat transferred from the heatsink is configured to warm a mirror within the housing.

11. The vehicle mirror assembly of claim 10, wherein emitted light from the first or second light source is directed in two opposing directions when the housing is disposed in the folded position.

12. The vehicle mirror assembly of claim 1, further comprising:
   a luminescent structure disposed on the vehicle and excitable by emitted light from the lamp assembly.

13. A vehicle mirror assembly, comprising:
    a housing on a side of the vehicle and operable between a deployed position and a folded position; and
    a lamp assembly in the housing having a light source configured to direct light forwardly and rearwardly of the housing when the housing is in the deployed and folded positions, wherein the lamp assembly illuminates a substantial area of the side of the vehicle when the housing is in the folded position, and wherein the lamp assembly illuminates a greater portion of the side of the vehicle in the folded position than in the deployed position.

14. The vehicle mirror assembly of claim 13, further comprising:
    an exterior sensor disposed on a vehicle and configured to detect an object proximate the vehicle, wherein the housing moves from the deployed to the folded position when the object is detected and the vehicle is moving below a predefined speed.

15. The vehicle mirror assembly of claim 13, further comprising:
    a camera disposed on a vehicle and configured to detect an object proximate the vehicle, wherein the housing moves from the deployed to the folded position when the object is detected and the vehicle is moving below a predefined speed.

16. A lamp assembly for a vehicle, comprising:
    a printed circuit board (PCB) attached to a rear housing on a side of the vehicle; and
    a reflector and a lens each operably coupled with a light source disposed on the PCB, wherein the housing is moved between a deployed position and a folded position and the light source directs emitted light forwardly and rearwardly of the rear housing in the deployed and the folded positions, wherein the lamp assembly further directs emitted light onto a substantial area of the side of the vehicle when the housing is in the folded position, and wherein the lamp assembly illuminates a greater portion of the side of the vehicle in the folded position than in the deployed position.

17. The lamp assembly for a vehicle of claim 16, wherein the rear housing is coupled to a housing of a vehicle mirror assembly.

18. The lamp assembly for a vehicle of claim 17, wherein the housing of the vehicle mirror assembly moves between the deployed position and the folded position.

19. The lamp assembly for a vehicle of claim 16, further comprising:
   a heatsink disposed within the housing of the vehicle mirror assembly and configured to capture at least a portion of heat generated by the light source.

20. The lamp assembly for a vehicle of claim 18, wherein the housing of the vehicle mirror assembly moves from the deployed position to the folded position when an object is proximate a vehicle and the vehicle is moving below a predefined speed.

\* \* \* \* \*